Feb. 4, 1947.    E. M. BOWEN    2,415,158
MACHINE TOOL
Filed July 13, 1945    2 Sheets-Sheet 2
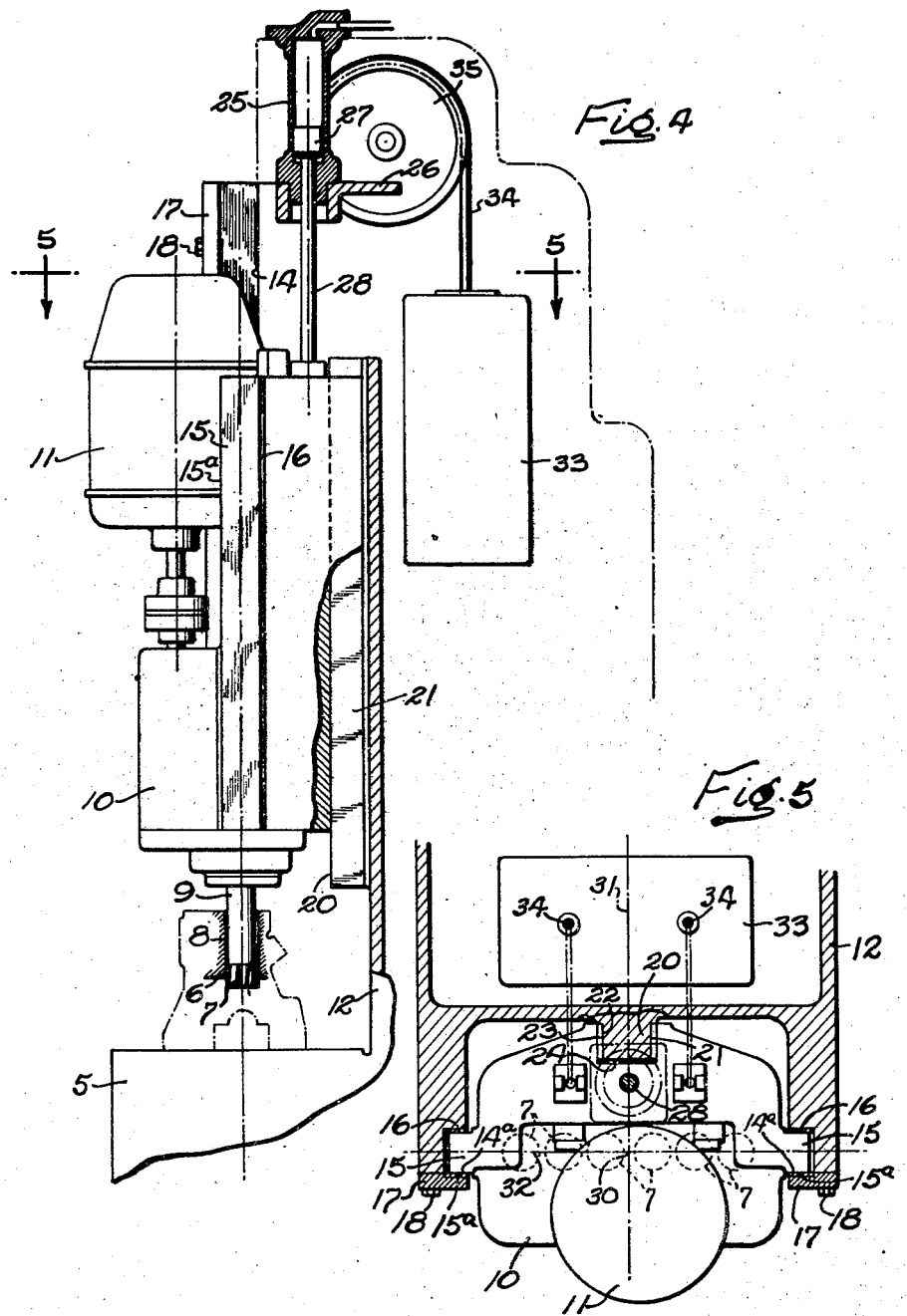
INVENTOR
Earl M. Bowen Patented Feb. 4, 1947

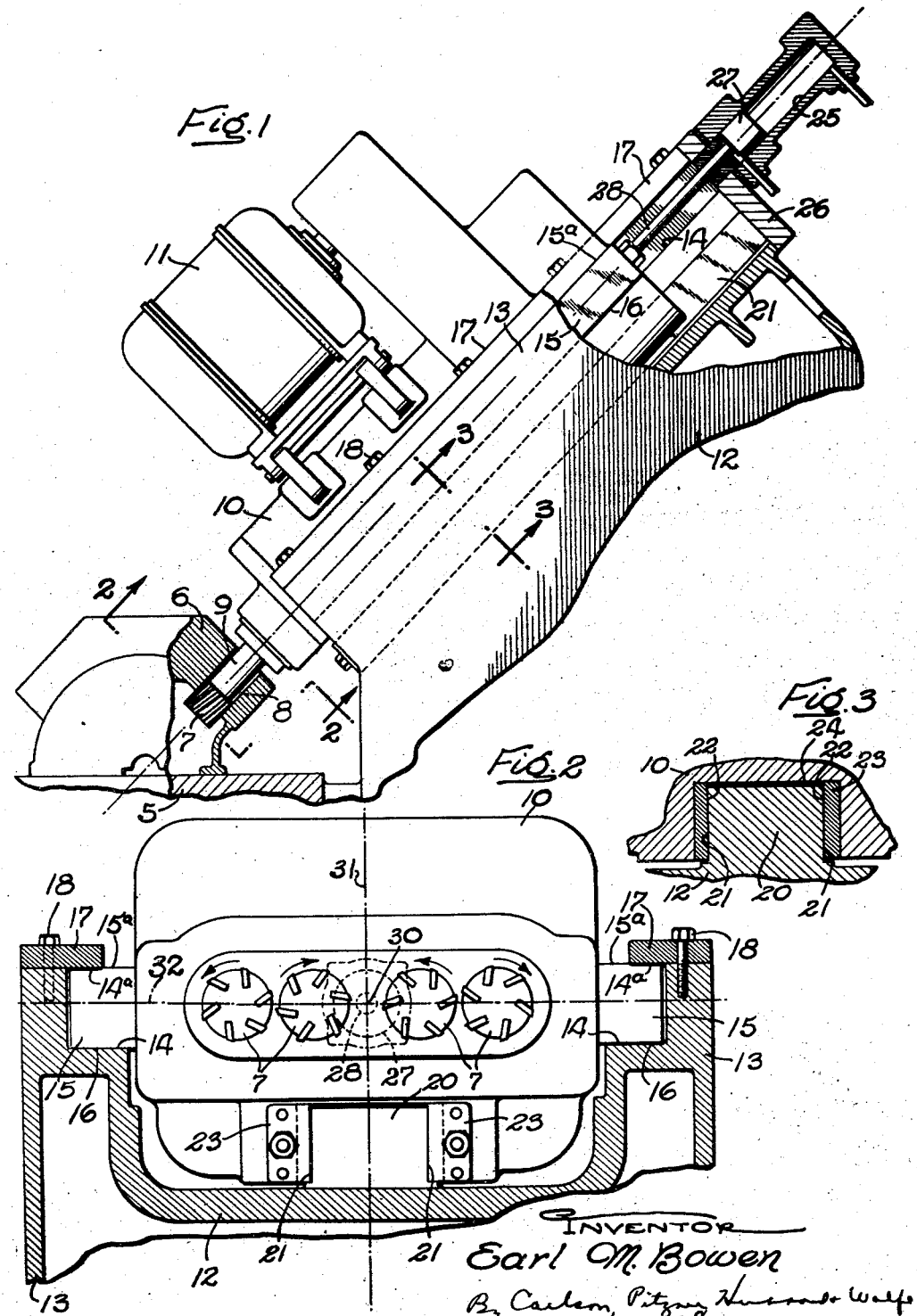

2,415,158

UNITED STATES PATENT OFFICE 2,415,158

MACHINE TOOL

Earl M. Bowen, Rockford, Ill., assignor to The Ingersoll Milling Machine Company, Rockford, Ill., a corporation of Illinois Application July 13, 1945, Serial No. 604,893

6 Claims. (Cl. 77—1)

This invention relates to machine tools having tool and work supports relatively reciprocated by a power driven actuator to bring one or more metal removing tools into operative engagement with a work piece.

The primary object is to provide a machine tool of the above general character in which the slidable machine tool element is guided with substantially greater accuracy than has been possible heretofore.

A more detailed object is to guide the machine tool element by generally flat ways effectively holding the element against rocking in one plane and by a separate set of flat ways that hold the element against tilting in a perpendicular plane, the ways being located so that their center planes intersect substantially along the line of action of the resultant of the actuating and reactionary forces applied to the element.

The invention also resides in the novel manner of balancing the cutting forces and thrusts in a multiple spindle machine tool.

Other objects and advantagess of the invention will become apparent from the following detailed description taken in connection with the accompanying drawings, in which Figure 1 is a side view partially in section of a boring machine incorporating the present invention.

Figs. 2 and 3 are fragmentary sections taken respectively along the lines 2—2 and 3—3 of Fig. 1.

Figs. 4 and 5 are views similar to Figs. 1 and 2, showing a modification.

The present application is a continuation-in-part of my application Serial No. 565,942, filed November 30, 1944, now abandoned.

The boring machine shown for purposes of illustration comprises generally a base 5 adapted to rest on the floor and providing a support to which a workpiece 6 may be clamped in proper position while being operated upon by rotary tools 7 which, as shown, are for boring a row of cylinders 8 in the workpiece. The tools are of standard construction and are fast on the ends of spindles 9 projecting from and journaled in one end of a head 10 which carries a motor 11 and contains transmission gearing for rotating the spindles in the directions indicated by the arrows in Fig. 2.

The head comprises a hollow casting having pairs of flat spaced parallel ways 15$^a$ and 16 formed on opposite sides thereof and mating with complemental pairs of ways 14 and 14$^a$ on laterally spaced rails 13 projecting from the column. The ways 15$^a$ and 16 are formed on opposite sides of longitudinal wings 15 which may be rigid either with the head or with the rails 13, being formed in this instance on opposite sides of the head 10 and projecting laterally therefrom. These wings overlie the ways 14 machined on the inner side of the rails and are held against the latter ways by clamps 17 having the way surfaces 14$^a$ formed thereon and secured by screws 18 to the outer side portions of the rails 13 which are spaced from and out of contact with the wings 15. In Fig. 4, the column 12 is similarly formed with ways along one vertical side to provide for a vertical approach of the tools to the work.

The head is guided laterally by a separate set of coacting ways also extending substantially throughout the length of the head and effectively holding the head against tilting in the plane of the supporting guideways 14. For this purpose, the column 12 is formed beneath the head with an outstanding rail 20 of relatively narrow width having opposite machined sides 21 which are flat and parallel with each other and, in this instance, disposed perpendicular to the plane of the guideways 14. The ways 21 are engaged by parallel surfaces 22 on gibs 23 mounted on opposite side walls of a recess 24 formed in the under side of the head casting. The gibs are mounted for longitudinal adjustment in the usual way to take up wear at the mating way surfaces 21 and 22. By offsetting the lateral guides 21 and 22 from the plane of the tool axes, it is possible to locate these guides relatively close together thereby reducing their width-to-length ratio to the desired value and correspondingly increasing the accuracy with which the head is guided laterally.

The head is reciprocated back and forth along the ways by a power actuator which, as shown in Figs. 1 and 2, preferably acts along the line 30 of intersection of a plane 31 which parallels and is disposed midway between the ways 21 and a plane 32 which is similarly centered between the ways 15$^a$ and 16. This actuator when of the hydraulic type, comprises a cylinder 25 mounted on a crosspiece 26 of the column 12 at the rear end of the head and a piston 27 whose rod 28 is fastened to the rear end of the head 10. The flow of pressure fluid to and from opposite ends of the cylinder is controlled in the usual way.

In the vertical spindle machine shown in Figs. 4 and 5, the tool driving motor is set in between the wings 15 in order to minimize the overhang of its weight with respect to the plane 32. With such an arrangement, it is usually more convenient to locate the axis of the piston 27 as shown, off from the center 30 a short distance and on the side of the latter opposite from the motor. A balance is thus established between the forces tending to tilt the tool head out of the plane 32. The lines of action of these forces, of course, lie in the plane 31 thereby eliminating any tendency to tilt the head sidewise.

To minimize the tendency of the reactionary forces exerted on the head to tilt the latter in either of the planes 31 and 32, the axes of the tools 7 are located in or as close as possible to the plane 32 and are spaced relative to the plane 31 so as to substantially balance the forces with respect to this plane. Thus, the four cutters of equal size as shown are disposed with their axes in the plane 32, and two are disposed on each side of the center 30 with the inner and outer ones equally spaced from the center. The reactions of one pair of cutters balance those of the other two with respect to the center 30.

Also, the forces which are due to the rotary cutting action and are directed laterally of the head are balanced so as to minimize their tendency to tilt the head. To this end, the cutters 7 are constructed for rotation of their spindles in the directions shown by the arrows in Fig. 2, such rotation being accomplished by proper design of the transmission gearing within the head 10. Thus, the adjacent and the remote cutters are rotated in opposite directions, and the remote cutter on one side is turned in a direction opposite to that of its adjacent inner cutter on the same side of the center 30.

By correlating the location, spacing and rotation of the cutter spindles relative to the line 30 of intersection of the center planes through the two pairs of guideways 14, 16 and 15ª, 17 and the two pairs of guides 21 and 22, the cutting forces are substantially balanced and the resultant of the end thrusts on the head 10 acts along a line substantially coincident with the center 30. By thus minimizing the tendency of the head to tilt and by employing the separate sets of ways, the head 10 is held very accurately in its intended line of motion thereby contributing to the extreme precision with which the bores may be formed in the workpiece.

In the form shown in Figs. 4 and 5, the weight of the tool head is counterbalanced by a weight 33 connected to the head through a flexible cable 34 extending around a pulley 35. The latter is located so that the line of action of the counterbalancing force coincides with that of the actuating force applied by the hydraulic actuator.

I claim as my invention:

1. A machine tool having, in combination, an elongated tool head, wing means extending along opposite sides of said head substantially throughout the length thereof and providing two pairs of oppositely facing flat parallel guide surfaces, with the surfaces of each pair spaced from each other a distance which is a small fraction of the length of said head, a base spaced below said head, spaced parallel rails rigid with and upstanding from said base and each carrying two flat parallel guideways longer than said head and mating with the guide surfaces of one of said pairs whereby the coacting surfaces and guideways restrain tilting of said head in only one plane about only two of three mutually perpendicular axes, means on the underside of said head extending substantially throughout the length thereof and providing two flat parallel ways disposed perpendicular to and midway between the pairs of guide surfaces and offset therefrom, said ways being spaced apart a small fraction of the length of said head, means on said base providing spaced parallel ways mating with said first mentioned ways and coacting therewith to restrain tilting of said head only in one plane perpendicular to said first mentioned plane only about two of said three axes, and rotary cutter spindle means projecting axially from one end of said head in the medial plane between the surfaces of each pair and centered with respect to the line of intersection of the medial planes between said surfaces and said ways.

2. A machine tool having, in combination, an elongated tool head, wing means extending along opposite sides of said head intermediate the top and bottom thereof and providing two pairs of oppositely facing flat parallel guide surfaces extending substantially through the length of the head with the surfaces of each pair spaced from each other a distance which is a small fraction of their lengths, a base spaced below said head, spaced parallel rails rigid with and upstanding from said base and each carrying two flat parallel guide surfaces longer than said head and mating with the surfaces of one of said pairs whereby the coacting surfaces restrain tilting of said head in only one plane, means on the underside of said head extending substantially throughout the length thereof and providing two flat parallel ways disposed perpendicular to and between the pairs of surfaces and offset therefrom, said ways being spaced apart a small fraction of the length of said head, means on said base providing spaced parallel ways mating with said first mentioned ways and coacting therewith to restrain tilting of said head only in one plane perpendicular to said first mentioned plane, and a rotary tool carrying means projecting axially from one end of said head and mounted on the latter in the medial plane between the surfaces of said pairs.

3. A machine tool having, in combination, an elongated tool support, a support therefor, two pairs of flat parallel surfaces on each of said supports respectively disposed on opposite sides of said tool support and mating with each other so as to restrain relative tilting of the supports in either direction in one plane only, a pair of flat parallel ways on a third side of said tool support, a pair of ways on said other support mating with said first mentioned ways to restrain relative tilting of said supports in a perpendicular plane, the ways and surfaces of each of said pairs extending throughout the length of said tool support and being spaced from each other only a small fraction of their lengths whereby said tool support is guided precisely in its endwise movement, and a plurality of rotary tool spindles projecting from one end of said tool support with their axes positioned relative to the medial planes between said surfaces and said ways and the line of intersection thereof so that the torsional and axial forces on the tool spindles on one side of the line of intersection of said planes opposes and substantially balances the forces on the spindles on the other side of the line.

4. A machine tool having, in combination, an elongated tool support, a support therefor, two pairs of flat parallel surfaces on each of said supports respectively disposed on opposite sides of said tool support and mating with each other so as to restrain relative tilting of the supports in either direction in one plane only, a pair of flat parallel ways on a third side of said tool support, a pair of ways on said other support mating with said first mentioned ways to restrain relative tilting of said supports in either direction in a perpendicular plane, the ways and surfaces of each of said pairs extending throughout the length of said tool support and being spaced from each other only a small fraction of their lengths whereby said tool support is guided precisely in its endwise movement, and a plurality of parallel and laterally spaced rotary tool spindles mounted on and projecting from one end of said tool support with the axes of all of the spindles lying in the medial plane between the surfaces of each of said pairs for rotating said spindles differentially to balance the torsional forces acting on the spindles during the cutting of metal by cutters on said spindles.

5. A machine tool having, in combination, an elongated tool support, a support therefor, two pairs of flat parallel surfaces on each of said supports respectively disposed on opposite sides of said tool support and mating with each other so as to restrain relative tilting of the supports in either direction in one plane only, a pair of flat parallel ways on a third side of said tool support, a pair of ways on said other support mating with said first mentioned ways to restrain relative tilting of said supports in either direction in a perpendicular plane, the ways and surfaces of each of said pairs extending throughout the length of said tool support and being spaced from each other only a small fraction of their lengths whereby said tool support is guided precisely in its endwise movement, a plurality of parallel and laterally spaced rotary tool spindles mounted on and projecting from one end of said tool support with the axes of all of the spindles lying in the medial plane between the surfaces of each of said pairs, said spindles being divided into two groups disposed on opposite sides of and correspondingly spaced away from the medial plane between said ways, and means by which the corresponding spindles of the different groups may be rotated in opposite directions and the spindles of each of said groups are rotated in opposite directions relative to each other.

6. A machine tool having, in combination, an elongated tool support, a support therefor, two pairs of flat parallel surfaces on each of said supports respectively disposed on opposite sides of said tool support and mating with each other so as to restrain relative tilting of the supports in either direction in one plane only, a pair of flat parallel ways on a third side of said tool support, a pair of ways on said other support mating with said first mentioned ways to restrain relative tilting of said supports in either direction in a perpendicular plane, the ways and surfaces of each of said pairs extending throughout the length of said tool support and being spaced from each other only a small fraction of their lengths whereby said tool support is guided precisely in its endwise movement, a plurality of parallel and laterally spaced rotary tool spindles mounted on and projecting from one end of said tool support with the axes of all of the spindles lying in the medial plane between the surfaces of each of said pairs, said spindles being divided into two groups disposed on opposite sides of and correspondingly spaced away from the medial plane between said ways, and means by which the corresponding spindles of the different groups may be rotated in opposite directions.

EARL M. BOWEN.

REFERENCES CITED

The following references are of record in the file of this patent:

UNITED STATES PATENTS

| Number | Name | Date |
| --- | --- | --- |
| 1,612,018 | Herchert | Dec. 28, 1926 |
| 272,857 | Coffin | Feb. 27, 1883 |
| 790,823 | Garfield | May 23, 1905 |
| 1,523,360 | Morgan | Jan. 13, 1925 |